March 29, 1938.  B. SCHWARZ  2,112,506

MEANS FOR IMPROVING THE COMMUTATION OF COMMUTATOR MOTORS

Filed Sept. 25, 1935  2 Sheets-Sheet 1

Inventor:
B. Schwarz
By: Glascock Downing Seebold
Attys.

Patented Mar. 29, 1938

2,112,506

UNITED STATES PATENT OFFICE 2,112,506

MEANS FOR IMPROVING THE COMMUTATION OF COMMUTATOR MOTORS

Benno Schwarz, Dusseldorf-Obercassel, Germany

Application September 25, 1935, Serial No. 42,127
In Germany February 21, 1934

5 Claims. (Cl. 171—228)

Measures of the improvement of the commutation of commutator motors, whether continuous current or alternating current commutator motors, have long been known. Thus, commutating poles in the commutating zone are used in order to produce a voltage in the coil group to be commutated, which is opposite in direction to the commutation voltage. Further, the use of damping windings and of resistance connections between winding and commutator is also known. These measures are not sufficient to produce in alternating current motors of high voltage or output a satisfactory commutation, in particular because in these motors still a further parasitic voltage occurs, namely the transformer voltage which is induced from the main flux. The commutation is moreover further detrimentally affected by transformer voltage proceeding from fields of a higher order.

The invention, which overcomes the difficulties mentioned, is based on the knowledge that the reactance of the coils to be commuted can be reduced if a second winding is connected to the commutator winding, through its segments, because the said winding is thereby connected in parallel with the main winding. It is true the auxiliary winding must still be connected in a particular way and must be disposed in a particular way relatively to the main winding in order that the intended effects are completely brought about.

The invention uses the idea, in order to improve the commutation of commutator motors, to connect an auxiliary winding through the commutator segments in parallel to the main armature winding. According to the invention consecutive parts of the main and auxiliary windings are connected to the same segments, whereby the degree of the magnetic linkage of these parts changes in such a way that consecutive winding parts of the main winding closely linked with one another are connected in parallel with consecutive winding parts of the auxiliary winding, which on their part are not linked, or only loosely linked, with one another, and inversely. It may be stated that a "close" and "loose" magnetic linkage of parts of the main and auxiliary winding can be attained in practice by arranging the corresponding parts of the winding either in the same or in different pairs of slots.

By the close magnetic linkage of the auxiliary winding a coil of the main winding disposed in an adjacent slot is connected in parallel with the winding to be commutated. This parallel connection of coils of the main winding can now, by arrangements which are described hereafter—and which are based on a determined relative position of main and auxiliary windings—be extended over the whole armature, so that a decrease of the reactance of the winding to be temporarily commutated to a fraction of its true value is the result.

In other words:

The coil temporarily to be commutated is linked with a stray magnetic field which contains that energy which was previously discharged in the so-called commutator spark on the passing of the brush. By means of the invention, that is by means of the transformer action of auxiliary and main winding, this energy is transmitted to other coils or to magnetic fields, which are linked with other slots.

The auxiliary coils are preferably disposed in the same slots as the main winding; however, the auxiliary coils connected to the same commutator segments are disposed in other slots than the coils of the main winding connected in parallel with them through the commutator segments. Both windings thereby have different spatial relative position to the relevant commutator segments; further both winding systems have a different winding step.

Magnetic material is disposed between auxiliary and main winding in order to increase the effect. The magnetic intermediate layer consists suitably of strips of sheet material disposed transversely to the slot.

All features of the invention can be seen from the constructional examples which are hereinafter described and illustrated in the accompanying drawings.

Figure 1:
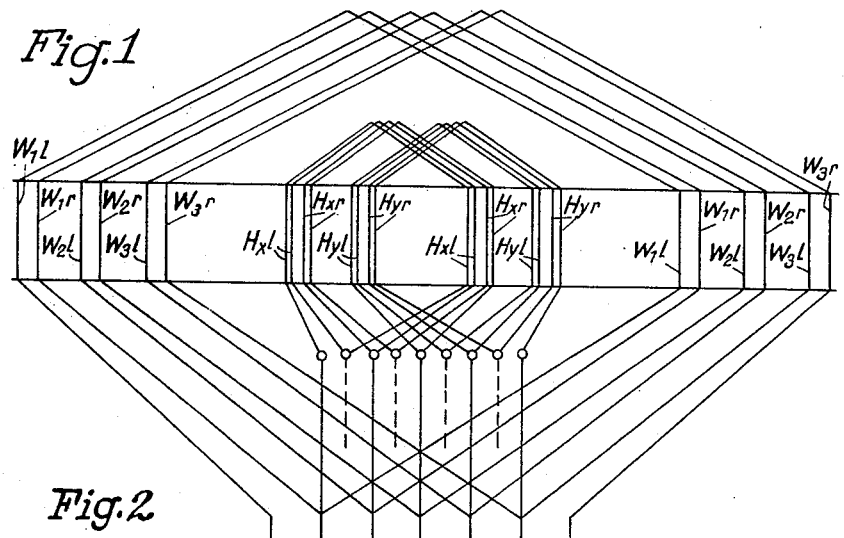
Figure 1 is a winding diagram showing the armature with commutator segments, of a commutator motor, also a main and auxiliary winding in slots of the armature together with their connections on the commutator segments.

The main armature winding consists of coils $W_{1_l}$ and $W_{1_r}$ which are disposed in common slots $N_1$ and $N_1'$. Further coils of the main armature winding, which are disposed in the slots $N_2$ and $N_2'$ are correspondingly denoted by $W_{2_l}$ and $W_{2_r}$. The winding contains therefore for example two bars per coil side which are constructed as a loop winding and are connected to the commutator segments 1, 2, 3 and so forth.

Auxiliary winding coils, disposed in the grooves $N_x$ and $N_y$ are connected to the same commutator segments. These auxiliary winding coils have the task of linking together in the manner of a transformer the coil groups of the main winding disposed in different slots, which is effected in the following manner.

To the commutator segments 2, 3 to which the coil group $W_{1_r}$ is brought, the coil group $H_{x_l}$ of the auxiliary winding is also connected. The latter group is disposed in the same slot systems $N_x$, $N_x'$ as the coil $H_{x_r}$ of the auxiliary winding, which on its side is connected to the commutator segments 3, 4. On these segments, however, is disposed also the coil group $W_2$ of the main winding which is arranged in the slots $N^2$ and $N_2'$.

The coil groups of the auxiliary winding $H_{x_l}$ and $H_{x_r}$ form a transformer which connects the coil group $W_{1_r}$ of the main winding at the time of the commutation in parallel with the coil group $W_{2_l}$ disposed in the slot $N_2$. In this way the reactance of the whole system is reduced to approximately one half. The auxiliary winding, in order to produce the same voltage as the main winding under the influence of the main field, has a winding step of one third of the pole pitch and with double the number of coils of the main winding.

In the slots $N_2$ and $N_2'$ is disposed the second coil group $W_{2_r}$, which in turn is again closely linked in the manner of a transformer with $W_{2_l}$ disposed in the same slots. On the other side the coil group $W_{2_r}$ is connected to the commutator segments 4, 5 to which the auxiliary coil group $H_{y_l}$ is connected in parallel. This latter is disposed in the slots $N_y$, $N_y'$ and constitutes therefore the transformer connection with the coil group $H_{y_r}$ disposed in the same slots. The coil group $H_{y_l}$ also constitutes a transformer connection with the main coil group $W_{3_l}$ which is disposed in the slot $N_3$ and is connected in parallel with $H_{y_r}$ through the commutator segments 5, 6. There exists therefore between $W_{2_l}$ and $W_{2_r}$ on the one hand and between $W_{2_r}$ and $W_{3_l}$ on the other hand (the latter through $H_{y_l}$ and $H_{y_r}$) a close transformer-like linkage. Therefore the part of the main winding $W_{3_l}$ disposed in the third group is also connected in parallel with the commutating systems so that the reactance of this system is reduced thereby to the third part.

Since, moreover, the coils $W_{1_r}$ and $W_{1_l}$ lie in the same slot, they are closely linked magnetically. The coil $W_{1_l}$ is on its side, of course, again linked with a coil of the main armature winding through a coil system (not shown) of the auxiliary winding, which is arranged on the right hand side in the left adjacent slot (likewise not shown) of the slot $N_1$.

This means that the linking of the coils progresses also to the left so that in this way the reactance voltages which occur are again halved. Since thus the above described transformer coupling is continued in the same way on both sides—that is, this coupling always varies between two coils of the main winding disposed in the same slots and such of the auxiliary winding—practically the whole winding of the armature is connected in parallel for the commutation if this disappearing small leakages between the coil systems disposed in the same slots is disregarded. The reactance voltage of the commutation is thereby reduced to a fraction of its normal value, so that the most difficult commutating conditions can be controlled without commutating poles.

The linking of the coils to be commutated with the adjacent coils has also a favorable influence on the disturbing action of the transformer voltage. The current produced by this voltage flowing in the coil which is temporarily short circuited by the brush, which is closed through the brush, produces on breaking, that is at the starting of the movement, the known brush sparking, which occurs in particular on starting in stator-fed machines. The action of this current interruption is considerably reduced of the inductive parallel connection of coils disposed in different slots.

Figure 3:
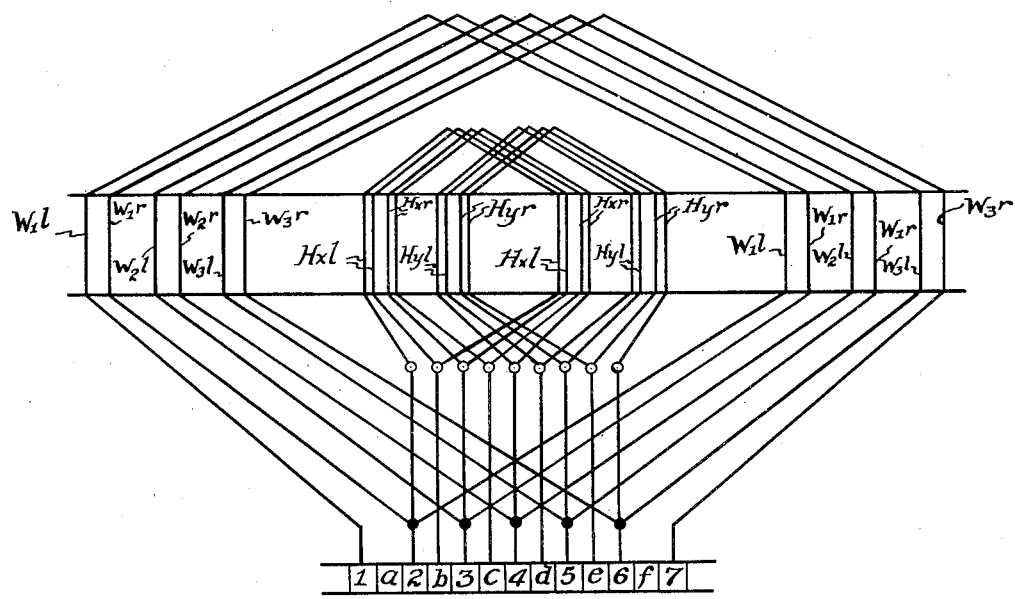
Figure 3 is a modified construction of the winding according to the diagram of Figure 1

A further improvement can be obtained by connecting intermediate segments to the auxiliary winding—which, as above mentioned, has more coils than the main winding. In Fig. 1 the terminal connections to the intermediate segments are indicated in dotted lines. The intermediate segments themselves are not illustrated in Fig. 1. This improvement is shown in Figure 3. Figure 3 shows the same diagram as Figure 1 except that the individual turns of the auxiliary winding H have tapping points which are brought to the commutator segments $a$, $b$, $c$, $d$, $e$, $f$, etc.; for example, the second turn of the coil $H_{x_l}$ to the commutator segment $b$ and the second turn of the coil $H_{x_r}$ to the segment $c$. The segment $b$ is between the commutator segments 2 and 3, the segment $c$ between the commutator segments 3 and 4. The commutator segments 2, 3, and 4 are the same as in Figure 1.

The transformer voltage can thereby be halved or even further divided, so that it amounts to only a fraction of the complete transformer voltage. Thereby the operating flux of the machine can be maintained greater than that flux which hitherto the highest permisssible transformer voltage gave. Thereby the limiting output of the motor can be increased to a multiple of that of previous machines. The arrangement of the auxiliary winding acts also to dampen all harmful fields of a higher order since the parallel connected main and auxiliary winding constitute damping coils for these fields of a higher order.

Figure 2:
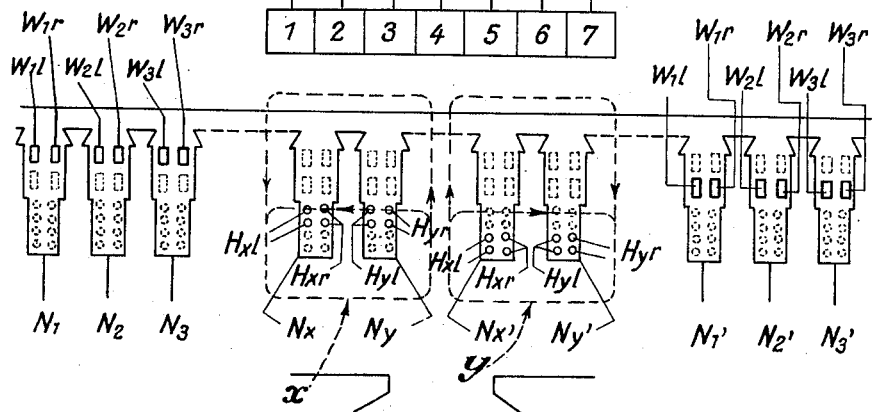
Figure 2 is a cross section through the armature slots of the same motor.

Further, in Fig. 2 the path for the fluxes is indicated, which links the auxiliary winding coils with one another. In this connection it is provided that the slots are open and are constructed in the usual way. It is true that a part of the flux passes also transversely through the space, but this circumstance is subordinate relatively to the part of the flux which closes through the air gap.

Figure 4:
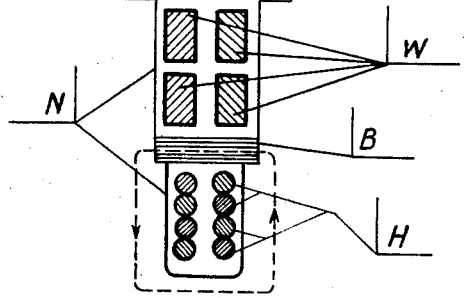
Figure 4 is a cross section through a slot of the armature on an enlarged scale.

In order not to be obliged to conduct these fluxes over the air gap, and therewith to be able to maintain at a low value the compensating and magnetizing currents occurring, the following course, which can be seen from Fig. 4, is taken.

The slot N is here so constructed that the auxiliary winding H is arranged in a narrower part than the main winding W. This construction has the purpose on the one hand to adapt the cross section of the slot to the space requirement for the two different windings, and on the other hand to maintain as high as possible the tooth widths in particular to the inner circle.

To shut off the lower part of the slot in which the auxiliary winding H is arranged, plates B are inserted which are supported on the shoulder in the slot. These plates represent simultaneously the closing and thereby also the mechanical securing of the auxiliary winding H. The flux which links the parts of the auxiliary winding with one another passes then in its essential parts through the magnetic sheets B following the path shown by dotted lines in Fig. 2.

The invention permits of a simple manufacture of both windings because these are laid in the usual way in open slots and permits there a special magnetic conclusion for the auxiliary fields without necessitating on that account the construction of the slots for the lower winding as closed slots.

I claim:

1. In a commutator motor having slots and commutator segments, a main winding and an auxiliary winding, each of both windings disposed in slots and each winding provided with more than one coil per slot, consecutive coils of one winding disposed in the same slots and connected in parallel through commutator segments with consecutive coils of the other winding which are disposed in different slots.

2. In a commutator motor having slots and commutator segments, a main winding and an auxiliary winding, each of both windings disposed in slots and each winding provided with more than one coil per slot, consecutive coils of one winding disposed in the same slots and connected in parallel through commutator segments, with consecutive coils of the other winding disposed in different slots, additional commutator segments, each segment disposed between two commutator segments of the main winding and said additional segments connected with tapping points of the auxiliary winding.

3. In a commutator motor having slots and commutator segments, a main winding and an auxiliary winding, each of both windings disposed in slots and each winding provided with more than one coil per slot, consecutive slots of one winding disposed in the same slots and connected in parallel through commutator segments with consecutive coils of the other winding disposed in different slots, said connections of coils of the main and auxiliary windings with the commutator segments being made for all parts of the main winding which are connected to commutator segments.

4. In a commutator motor having slots and commutator segments, a main winding and an auxiliary winding, each of both windings, disposed in the same system of slots and provided with more than one coil per slot, magnetic material inserted in each slot between main and auxiliary windings, consecutive coils of one winding disposed in the same slots and connected in parallel through commutator segments with consecutive coils of the other winding disposed in different slots.

5. In a commutator motor having slots and commutator segments, a main winding and an auxiliary winding, each of both windings disposed in the same system of slots and provided with more than one coil per slot, strips of sheet metal arranged in each slot transversely to the slot and inserted between the main and auxiliary windings, consecutive coils of one winding disposed in the same slots and connected in parallel through commutator segments with consecutive coils of the other winding which are disposed in different slots.

BENNO SCHWARZ.